(12) United States Patent
Järredal

(10) Patent No.: US 8,437,350 B2
(45) Date of Patent: May 7, 2013

(54) ACCESS CONTROL FOR AN IP ACCESS NETWORK TO MULTICAST TRAFFIC

(75) Inventor: Ulf Järredal, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 260 days.

(21) Appl. No.: 12/992,381

(22) PCT Filed: May 21, 2008

(86) PCT No.: PCT/EP2008/004096
§ 371 (c)(1),
(2), (4) Date: Feb. 26, 2011

(87) PCT Pub. No.: WO2009/140983
PCT Pub. Date: Nov. 26, 2009

(65) Prior Publication Data
US 2011/0149961 A1    Jun. 23, 2011

(51) Int. Cl.
*H04L 12/28* (2006.01)
*H04L 12/56* (2006.01)
*G06F 15/16* (2006.01)

(52) U.S. Cl.
USPC .......................... 370/390; 370/392; 709/203

(58) Field of Classification Search .................. 370/389, 370/390, 392; 709/203
See application file for complete search history.

(56) References Cited

U.S. PATENT DOCUMENTS

| | | | | |
|---|---|---|---|---|
| 2003/0147392 | A1* | 8/2003 | Hayashi et al. | 370/390 |
| 2004/0117430 | A1* | 6/2004 | Bazot et al. | 709/200 |
| 2006/0146857 | A1 | 7/2006 | Naik et al. | |

FOREIGN PATENT DOCUMENTS

| | | | |
|---|---|---|---|
| EP | 1 424 807 A | 6/2004 | |
| EP | 1 715 628 A | 10/2006 | |
| WO | 02/45334 A | 6/2002 | |

OTHER PUBLICATIONS

PCT International Search Report, dated Mar. 11, 2009, in connection with International Application No. PCT/EP2008/004096.
PCT Written Opinion, dated Mar. 11, 2009, in connection with International Application No. PCT/EP2008/004096.
Karppinen et al. "Multicase access control concept for xDSL-customers" 3rd Consumer Communications and Networking Conference, 2006, IEEE, Las Vegas, NV, USA, Jan. 8-10, 2006, vol. 1, pp. 448-452, XP010893248, ISBN: 978-1-4244-0085-0.
Tsunemasa Hayashi et al. "Issues Related to Receiver Access Control in the Current Multicast Protocols; draft-ieft-mboned-rac-issues-03.txt" IETF Standard-Working-Draft, Internet Engineering Task Force, IEFT, CH, vol. mboned, No. 3, Apr. 19, 2006, XP015045419.
Deering, S. "Host Extensions for IP Multicasting" Network Working Group RFC 1112, Aug. 1989.
Fenner, W. "Internet Group Management Protocol, Version 2" RFC 2236, Nov. 1997.
Cain, B. et al. "Internet Group Management Protocol, Version 3" RFC 3376, Oct. 2002.

* cited by examiner

*Primary Examiner* — Ronald Abelson
(74) *Attorney, Agent, or Firm* — Potomac Patent Group PLLC

(57) ABSTRACT

A method and arrangement are proposed for controlling access by a client node to multicast traffic via an access network. When a client node sends a message to an access node of the access network requesting access to a multicast channel, the access node modifies this request by adding identification information to the message for identifying the client node before forwarding it to a router capable of routing multicast traffic streams. The router uses the identification information to consult access data stored for the client node and returns an acknowledgement message to the access node, indicating whether access is permitted. If access is granted, the access node streams the multicast channel to the client node. Modifying the multicast request message using the access node to include identification information allows the access control to be performed in a more centralized manner while retaining the security of a port-based access control.

14 Claims, 3 Drawing Sheets

| Subscriber ID Access Node/Port | Multicast Channel 1 | Multicast Channel 2 | Multicast Channel 3 | | Multicast Channel n |
|---|---|---|---|---|---|
| AN1 / 3 | 1 | 0 | 0 | | 0 |
| AN1 / 5 | 0 | 1 | 1 | | 0 |
| . | . | . | . | | . |
| . | . | . | . | | . |
| . | . | . | . | | . |
| ANn / 2 | .1 | 0 | 0 | | 0 |

ACCESS CONTROL FOR AN IP ACCESS NETWORK TO MULTICAST TRAFFIC

TECHNICAL FIELD

The present invention concerns the control of access to multicast applications, such as video-on-demand (VOD) or television via the internet (IP-TV) in a packet-switched access network. It has particular relevance for Ethernet point-to-point access networks.

BACKGROUND

Multicast applications via the Internet are becoming more and more widespread. These include television over IP or video-on-demand applications, where a subscriber may have a long term subscription to a particular service or simply request access to an individual transmission for the duration of that transmission. When a packet-switched network, such as an Ethernet point-to-point access network, is used to provide subscribers with access to multicast traffic services via the Internet or another external network, it is essential that some kind of access control is provided to ensure that only users that have subscribed to the service are permitted access.

One existing control option is the encryption of the multicast traffic flow. Generally, different multicast channels will have a separate encryption key. Subscribers to the encrypted multicast channel are provided with the corresponding encryption key by the multicast service provider. For each multicast channel, the encryption key will be the same for all users. This encryption key may be distributed to the users in a number of ways, for example, on a smartcard or as a software encryption certificate. However, the encryption of such services is not very secure, particularly when a set-top box using an open source operating system is used (such as the Dreambox, which uses Linux). These systems use an open source application program interface (API) to interface with a module that receives the smartcard or credit card. Such systems are generally connected to the Internet; hence by simply and legally modifying the (API), it is possible to access the encryption key and share this key over the internet. Even without the open source option, users with a more advanced understanding of encryption may also be capable of deciphering an encryption key, particularly when both the encrypted and the non-encrypted data streams are available, as is the case when a set-top box is used with a valid smart card.

A more secure manner of controlling access to multicast traffic is a port-based control. This requires an access node of the access network to hold a list of the access rights of connected subscribers to the various multicast services. The subscriber is identified by the physical Ethernet or ADSL port number of the access node to which it is attached. While such a control is effective, the administration required to maintain an access list for each physical port of an access node is very burdensome. Every change in the services offered must be registered in all access nodes carrying a list of access rights. For example, when a multicast service provider offering a bundle of TV channels needs to modify the composition of this bundle by adding or removing channels, this information must be updated on all access lists.

Moreover, while a service provider can be given access rights to an access node (for example using Simple Network Management Protocol, Management Information Base and Command Line Interface SNMP/MIB/CLI) in the absence of any access management system, this access presently permits either read-only rights or full rights to an access node. Providing full access rights would enable access to all access lists, even those from other multicast service providers. Such an option is clearly not desirable.

SUMMARY

It is an object of the present invention to provide an access control arrangement that overcomes the problems of existing prior art arrangements.

It is a further object of the present invention to provide an access control mechanism that is secure yet removes the administrative burden connected with existing access control mechanisms.

The above and further objects are achieved in accordance with the present invention in a method, an access node and a router as described below.

In accordance with a first aspect of the invention, there is proposed a method for controlling access by a client node to multicast traffic streams in a packet-switched access network, wherein the client node is connected to the packet-switched network via an access node. In accordance with this method, the access node receives a multicast request message from the client node, where the message is for requesting access to at least one multicast channel. The access node adds identification information to the multicast request message, where this identification information is for identifying the client node. The access node then forwards the message to a router capable of routing multicast traffic streams. The access node receives an acknowledgement message from the router, the acknowledgement message indicating whether the requested access to the at least one multicast channel is permitted and the access node then streams the at least one multicast channel to the client node when the acknowledgement message indicates that access is permitted.

By using the access node to including information identifying the client node within the multicast request message, it is possible to move the access control for client nodes away from the access node. The data necessary to ensure reliable access control is thus available at locations other than the access nodes, enabling a more centralised access control. By removing the access list from the access node, the administrative operation is both simplified and made more efficient, as an appropriate management system can then be implemented facilitating the maintenance by multicast service providers.

Preferably, the identification information added to the multicast request message is appended to this message as a suffix or tag. This allows existing protocol messages to be used.

In a preferred embodiment, the router, upon receiving the multicast request message, uses the identification information added to the message to consult stored data to determine whether said client node is permitted to access the at least one multicast channel. By permitting a router to determine the access rights of client nodes to multicast channels, the access lists may be kept at a reasonable size while being more easily accessible by multicast service providers.

In accordance with a further aspect of the invention, there is proposed an access node of a packet-switched access network for providing access for at least one client node to multicast traffic. The access node has a plurality of ports for connecting with client nodes, and is further adapted to communicate with at least one router for multicast traffic in the packet-switched network. The access node is further adapted such that, upon receipt of a request message requesting at least one multicast traffic channel from a client node via a port, it modifies the request message by adding information identifying the client node, transmits the modified request message to a router for multicast traffic, and starts streaming the at least one requested multicast traffic channel to the client node upon receipt of an acknowledgement message from the router affirming the access right of the client node to the at least one requested multicast traffic channel.

In accordance with a still further aspect of the present invention, there is proposed a router for routing multicast traffic to at least one access node in a packet-switched access network. The router is adapted to receive a request message requesting access to at least one multicast traffic channel from an access node. The request message includes information identifying a client node. The router is further adapted to use the information identifying the client node to consult a storage element containing information identifying the access rights of a plurality of client nodes to a plurality of multicast traffic channels to determine the access rights of the client node to the at least one multicast traffic channel. The router is also adapted to transmit an acknowledgement message to the access node, this acknowledgement message indicating whether the client node is granted access to the at least one traffic channel.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
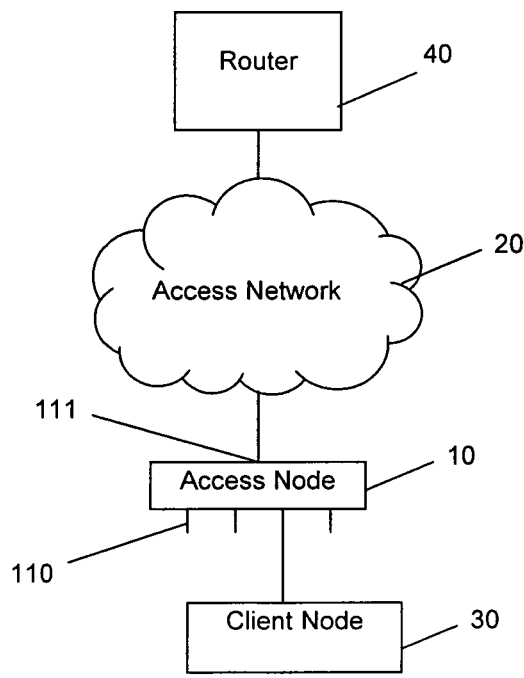
FIG. 1 schematically illustrate the connections for routing multicast traffic between a client node and a multicast router via an access network, FIG. 2 schematically illustrate the connections for routing multicast traffic between a client node and a multicast router via an access network modified in accordance with the present invention.

FIG. 1 schematically shows the connection between a client node and a multicast router via an access network. In the exemplary embodiment, the access network denoted by 20 is an Ethernet point-to-point network, however, it will be understood that it may be another packet-switched network. The access network includes multiple access nodes, only one of which, access node 10, is represented in FIG. 1. The access node 10 is illustrated with one uplink port 111, which is connected to the core access network 20 composed of multiple non-shown layer 2 switches or nodes. A multicast router 40 is shown connected to the access network 20. This multicast router 40 is capable of routing multicast traffic received from one or more multicast service providers, such as a video server or the like, possibly via further multicast routers, none of which are illustrated in the figures. The access node 10 also has a number of downlink ports 110 with a client node 30 shown connected to one of these. The client node 30 represents any device or equipment capable of receiving multicast traffic and issuing a multicast traffic request for example, for video-on-demand or television over IP and may include a set-top box or a PC. Further, not illustrated, client nodes may be connected to the remaining downlink ports 110 of the access node 10.

The most common signalling protocol for handling IP version 4 multicast traffic is the Internet Group Management Protocol (IGMP). Three versions of IGMP exist and are described in the "Request for Comments" (RFC) documents of the Internet Engineering Task Force (IETF). More specifically IGMP version 1 is described in RFC 1112, IGMP version 2 in RFC 2236 and IGMP version 3 in RFC 3376. This protocol is used by the client node 30, the adjacent network nodes 10, 20 and the local multicast router 40. IGMP is used to manage the membership of Internet Protocol multicast groups and permits a subscriber or client node to join or leave a multicast group, i.e. receive a particular multicast channel or stream. A third, query command allows a multicast server to determine whether a service is still being used. IGMP does not support access control, although it does permit the creation of an access list or "white list" for each client node or physical port of the access node, providing that the access node supports such a function. Examples of commercially available Ethernet based access nodes that support the creation of an access list for each subscriber or client node include the ADSL Ethernet modems EDA ESN312 and EFN324 available from Ericsson. With this form of access control the access node 10, upon receiving an IGMP join request from the client node 30, decides on the basis of information on the access list whether the subscriber is permitted to receive a multicast channel. If access is permitted, the access node 10 either forwards the join request to the multicast router 40, which responds by streaming the multicast channel to the access node 10. The access node 10 then streams the channel to the port 110 to which the client node 30 is connected. If the multicast stream is already being received by the access node 10, this node 10 simply streams it to the corresponding port 110. Conversely, if the client node 30 is not permitted access to the requested multicast channel, the access node 10 blocks or discards the join request and prevents the multicast stream from reaching the corresponding port 110.

Creating and maintaining access lists in access nodes 10 requires knowledge of the identification and location of each subscriber, i.e. the access node port to which the subscriber's equipment or the client node is connected, as well as the access rights for each subscriber. Updating the subscriber information is primarily performed by the access network 20, however, the access rights are generally managed by multicast service providers that have access to the list held at, or for, each access node. This arrangement is problematic not merely because of the difficulty in tracking each subscriber and the sheer number of lists that need to be managed, but also because the management protocols conventionally utilised cannot limit the access rights of the multicast service providers to the access nodes. Consequently in an open network with several multicast service providers it would not be possible to prevent one multicast service provider from accessing information held on competing providers or their customers. Such a situation is not acceptable from a commercial standpoint.

In accordance with the present invention, access control is provided without the need for multiple lists and the attendant access problems. The access control mechanism according to the present invention will be described with reference to FIGS. 2 to 5.

Figure 2:
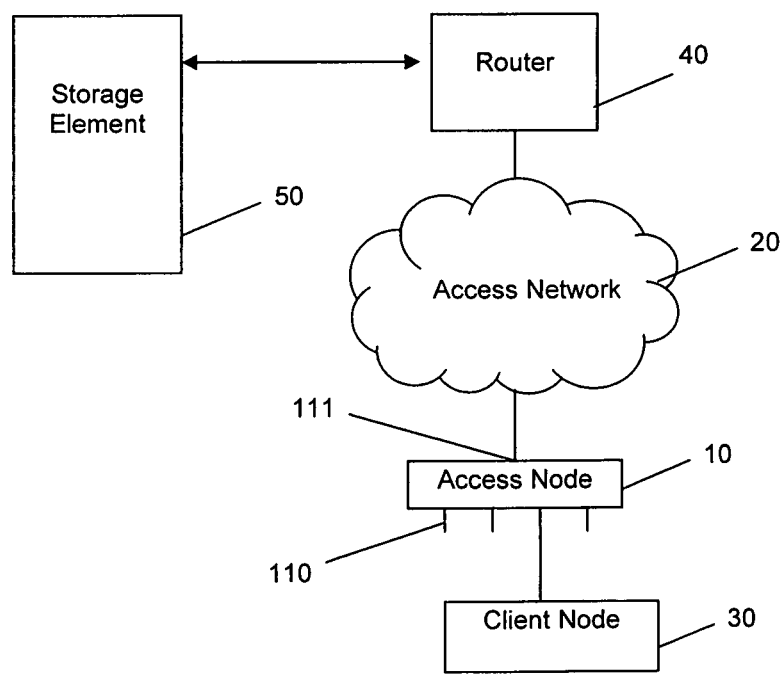
Figures 3, 5:
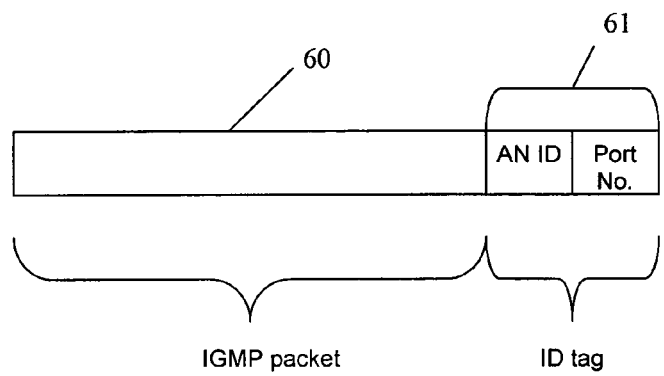
FIG. 3 illustrates the organisation of data in the storage element shown in FIG. 2, FIG. 4 schematically shows a modified multicast request packet in accordance with the present invention.
FIG. 5 illustrates the signalling sequence for verifying multicast channel access rights of the client node.

FIG. 2 schematically shows the connection between a client node 30 and a multicast router 40 via an access network. Many elements of this figure are identical to those shown in FIG. 1 and like parts have been given like reference numerals. For this reason, a repeat description of these parts will be dispensed with. The arrangement shown in FIG. 2 differs from that in FIG. 1 by the provision of a storage element 50 for storing access data that can be accessed by the router 40. This storage element 50 may be in the form of a database or simply a look-up table contained in a storage medium. Its location is such that it may be accessed by multiple routers 40 capable of handling multicast traffic as well as the multicast service providers, who provide the multicast channels entered in the access list. In some cases, a number of storage elements 50 may be distributed through several networks to simplify and expedite access from these networks, however, the number of elements will always be significantly less than the number of access nodes 10 handling multicast traffic. The storage element 50 contains access information at least for all client nodes connected via the access network 20 and possibly also for client nodes connected to other access networks. The structure of the information held in the storage element 50 is illustrated in the table of FIG. 3. The information shown in the table of FIG. 3 indicates the access rights of subscribers for various multicast channels. In the illustrated embodiment, each client node 30 is represented by a row while each column represents a multicast channel or group of channels for which the access rights are stored. In practice, access rights will often be entered for multiple multicast channels offered as a specific bundle rather than for individual channels. In FIG. 3, the client nodes are identified by the access node and port number to which they are connected. The access node 10 (denoted by AN1 to ANn in FIG. 3) may be represented by a number, name, DNS name or other unique identifier. The various multicast channels or channel groups, represented by multicast channel "1" to multicast channel "n" in FIG. 3 are also provided with an appropriate recognised identifier. In FIG. 3, only full access rights or zero access rights are shown; the presence of a "0" in the column representing a specific multicast channel indicates that the client node has no access rights to this channel; the presence of a "1" indicates that access is permitted. Although not shown in the figure, it is conceivable that other types of access rights may be listed, for example temporary access rights or access only at specific times of the day.

Figure 4:
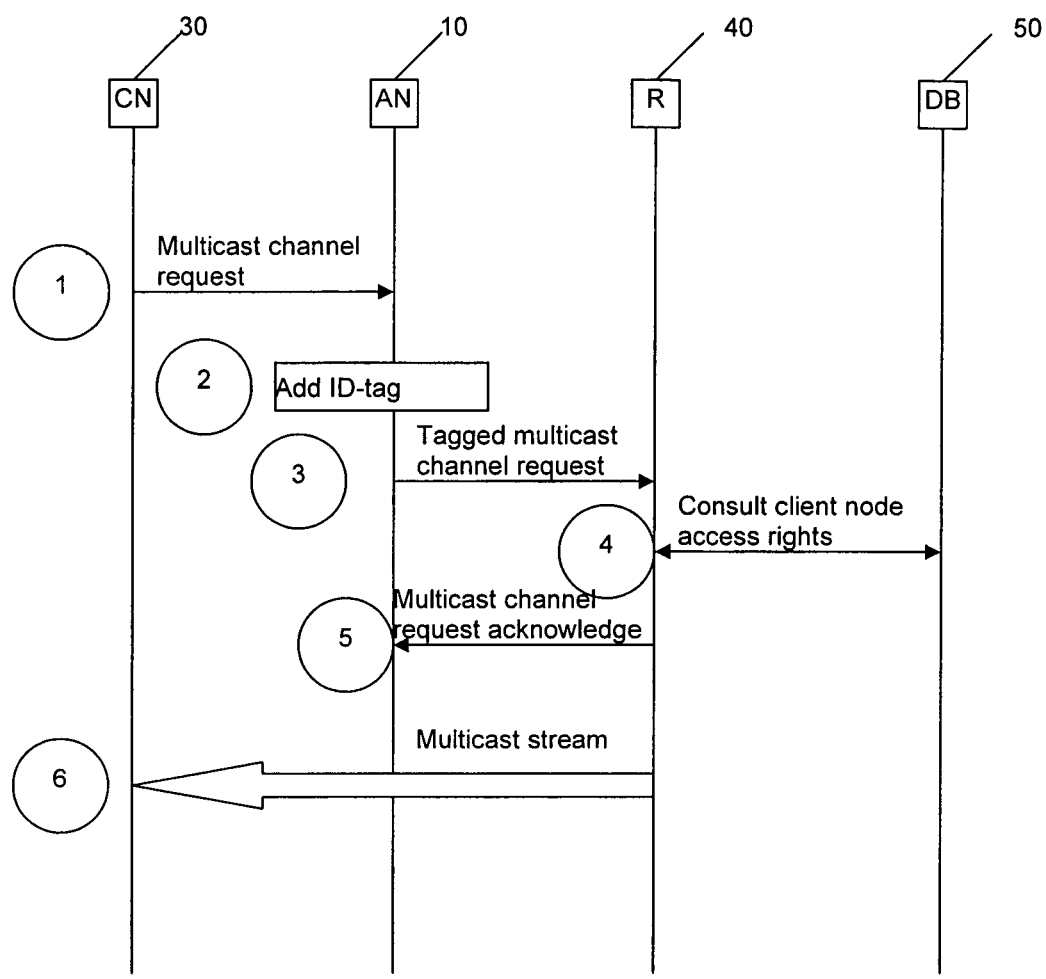

FIG. 4 illustrates the signalling sequence followed when client node 30, denoted in FIG. 4 by "CN" requests a multicast channel from an access node 10, denoted by "AN" in FIG. 4. The multicast router 40 is denoted by "R" and the storage element or database 50 is denoted by "DB". At event 1, the client node 30 sends a request for a multicast channel. This request is essentially an IGMP join message identifying the multicast channel by the corresponding IP group address. The format of this message is described in IETF RFC 1112. When the access node 10 receives this message, it appends an identification tag (ID tag) to it at event 2, before forwarding the modified IGMP join message to the router 40. The structure of this modified message is illustrated in FIG. 5. The multicast request message, or, in this case the IGMP join message is denoted by 60 and the ID tag by 61. The ID tag serves to identify the client node 30 and includes information identifying the access node 10, denoted "AN ID" in FIG. 5, and the access node port number 110 to which the client node 30 is connected, denoted "Port No." in FIG. 5. As is clear from FIG. 5, the content of the multicast protocol (IGMP) packet 60 is not modified, it is simply extended by the ID tag 61. The form of this identification should ideally be the same as that held in the storage element 50 to preclude the need for translation. In other words, the manner in which the access node 10 is identified, i.e. by number, name or DNS name, should be the same as used in the storage element 50. Turning again to FIG. 4, at event 4, the router accesses the data contained in storage element 50 and, using the ID tag 61 appended to the join message 60, determines whether the identified client node has the right to access the requested channel. The router 40 then sends a join request acknowledgement message to the access node 10 at event 5 which indicates whether access to the requested multicast channel is denied or granted. If access is granted, the router 40 checks whether the requested multicast channel is being streamed to the access node 10. If this is not the case, the router 40 starts the selected stream at event 6. Upon receipt of the acknowledgment message at event 5, the access node 10 prepares to stream the selected multicast flow to the port to which the client node 30 is connected. If, on the other hand, access to the requested channel is denied, no new multicast stream toward the access node 10 is started by the router. If the requested multicast stream already exists between the router 40 and the access node 10, the access node, upon receipt of the acknowledgement message indicating no access rights, continues to block the multicast stream towards the port to which the client node is connected. The acknowledgement message includes some information relating to the join request message it acknowledges. Preferably it includes information identifying the client node in the same manner as the ID tag shown in FIG. 4.

The data contained in storage element 50 will be accessible and maintained primarily by multicast service providers. For this reason, the storage element 50 preferably includes some form of access management system that prevents multicast service providers from being able to access data on competing providers or their customers.

The invention claimed is:

1. Method for controlling access to multicast traffic streams in a packet-switched access network by a client node, said client node being connected to said packet-switched network via an access node, including the steps of:

said access node receiving from said client node a multicast request message requesting access to at least one multicast channel;

said access node adding identification information to said multicast request message for identifying said client node and forwarding said message to a router capable of routing multicast traffic streams;

said access node receiving from said router an acknowledgement message indicative of whether the requested access to said at least one multicast channel is permitted; and streaming said at least one multicast channel to said client node when said acknowledgement message indicates that access is permitted, wherein said step of adding identification information to said multicast request message includes adding information identifying said access node and information identifying a port of said access node to which said client node is connected.

2. A method as claimed in claim 1, wherein said step of adding identification information to said multicast request message includes appending said identification information to said multicast request message as a suffix.

3. A method as claimed in claim 1, wherein said router, upon receiving said multicast request message, uses the identification information added to said message to consult stored data to determine whether said client node is permitted to access said at least one multicast channel.

4. A method as claimed in claim 3, wherein said step of consulting stored data includes querying a database containing said stored data.

5. A method as claimed in claim 1, wherein the step of receiving an acknowledgement message indicative of whether the requested access to said at least one multicast channel is permitted includes identifying identification information identifying said client node contained in said acknowledgement message.

6. An access node of a packet-switched access network for providing access for at least one client node to multicast traffic, said access node having a plurality of ports for connecting with client nodes, said access node being further adapted to communicate with at least one router for multicast traffic in said packet-switched network, wherein said access node, upon receipt of a request message requesting at least one multicast traffic channel from a client node via a port, is further adapted:
- to modify said request message by adding information identifying said client node;
- to transmit said modified request message to a router for multicast traffic; and
- to start streaming the at least one requested multicast traffic channel to said client node upon receipt from said router of an acknowledgement message affirming the access right of said client node to said at least one requested multicast traffic channel,
- wherein said information identifying the client node includes information identifying the port to which the client node is connected and information identifying said access node.

7. An access node as claimed in claim 6, wherein said information identifying said access node includes any one of a name, number or domain name server name identifying the access node.

8. An access node as claimed in claim 6, wherein said access node is further adapted to modify said request message by appending said information identifying said client node to said request message as a suffix.

9. An access node as claimed in claim 6, wherein said access node is further adapted to prevent streaming of said at least one multicast channel to said client node when said acknowledgement message indicates that said client node is denied access to said at least one requested multicast channel.

10. An access node as claimed in claim 6, further adapted to operate in an Ethernet access network.

11. A router for routing multicast traffic to at least one access node in a packet-switched access network, wherein said router is adapted:
- to receive a request message requesting access to at least one multicast traffic channel from an access node, said request message including information identifying a client node;
- to use said information identifying said client node to consult a storage element containing information identifying the access rights of a plurality of client nodes to a plurality of multicast traffic channels to determine the access rights of said client node to said at least one multicast traffic channel; and
- to transmit an acknowledgement message to said access node, said acknowledgement message indicating whether said client node is granted access to said at least one traffic channel,
- wherein said information identifying the client node includes information identifying the port to which the client node is connected and information identifying said access node.

12. A router as claimed in claim 11, wherein said router is further adapted to start sending the requested multicast traffic channel to said access node upon receipt of a response from said storage element indicating that access rights of said client node to said requested at least one multicast traffic channel are granted.

13. A router as claimed in claim 11, wherein said router is further adapted to send an acknowledgement message to said access node denying the access right of said client node to said at least one requested multicast traffic channel upon receipt of a response from said database indicating that access rights of said client node to said requested at least one multicast traffic channel are denied.

14. A router as claimed in claim 11, wherein said router is further adapted to include information identifying said client node in said acknowledgement message.

* * * * *